March 7, 1961  C. SABATT  2,973,849
CLUTCH FOR PRESSES AND THE LIKE
Filed March 31, 1959  2 Sheets-Sheet 1

INVENTOR
CHARLES SABATT
BY Francis J. Klempay
ATTORNEY

March 7, 1961 C. SABATT 2,973,849
CLUTCH FOR PRESSES AND THE LIKE
Filed March 31, 1959 2 Sheets-Sheet 2

INVENTOR
CHARLES SABATT
BY Francis J. Klempay
ATTORNEY

United States Patent Office 2,973,849
Patented Mar. 7, 1961

---

2,973,849

CLUTCH FOR PRESSES AND THE LIKE

Charles Sabatt, 137 Ohio Ave., Niles, Ohio

Filed Mar. 31, 1959, Ser. No. 803,158

1 Claim. (Cl. 192—67)

The present invention relates generally to clutch mechanism for punch presses and the like.

It is the primary or ultimate object of the present invention to provide a highly improved and simplified clutch mechanism for presses and the like which is provided for transmitting the driving torque from a flywheel to a crankshaft upon which the flywheel is journaled. The clutch is movably mounted on the crankshaft and comprises a plurality of protruding clutch teeth which are adapted to engage and be nestingly received within a plurality of openings in the flywheel to drivingly interconnect the flywheel and the crankshaft.

A further object of the invention is to provide clutch mechanism for presses and the like which embodies improved, highly simplified and extremely rugged means for mounting the clutch teeth.

Another object of the invention is the provision of clutch mechanism for presses and the like which is particularly constructed so that expensive machining operations are avoided and in which the parts that are subjected to wear can be replaced simply and inexpensively in a minimum of time and with a minimum of effort.

Yet another object of the invention is to provide clutch mechanism for presses and the like which is characterized by its ruggedness and ability to withstand sustained and continuous usage. As will be understood, a clutch for driving a press is subjected to extremely high stresses and the apparatus of the present invention is well adapted to withstand such stresses.

Still another object of the invention is to provide improved means for moving the clutch mechanism into and out of driving engagement with the continuously rotating flywheel.

The above, as well as other objects and advantages of the invention, will be apparent to those skilled in the art upon consideration of the following specification and accompanying drawing wherein there is disclosed a preferred embodiment of the invention.

Figure 1:
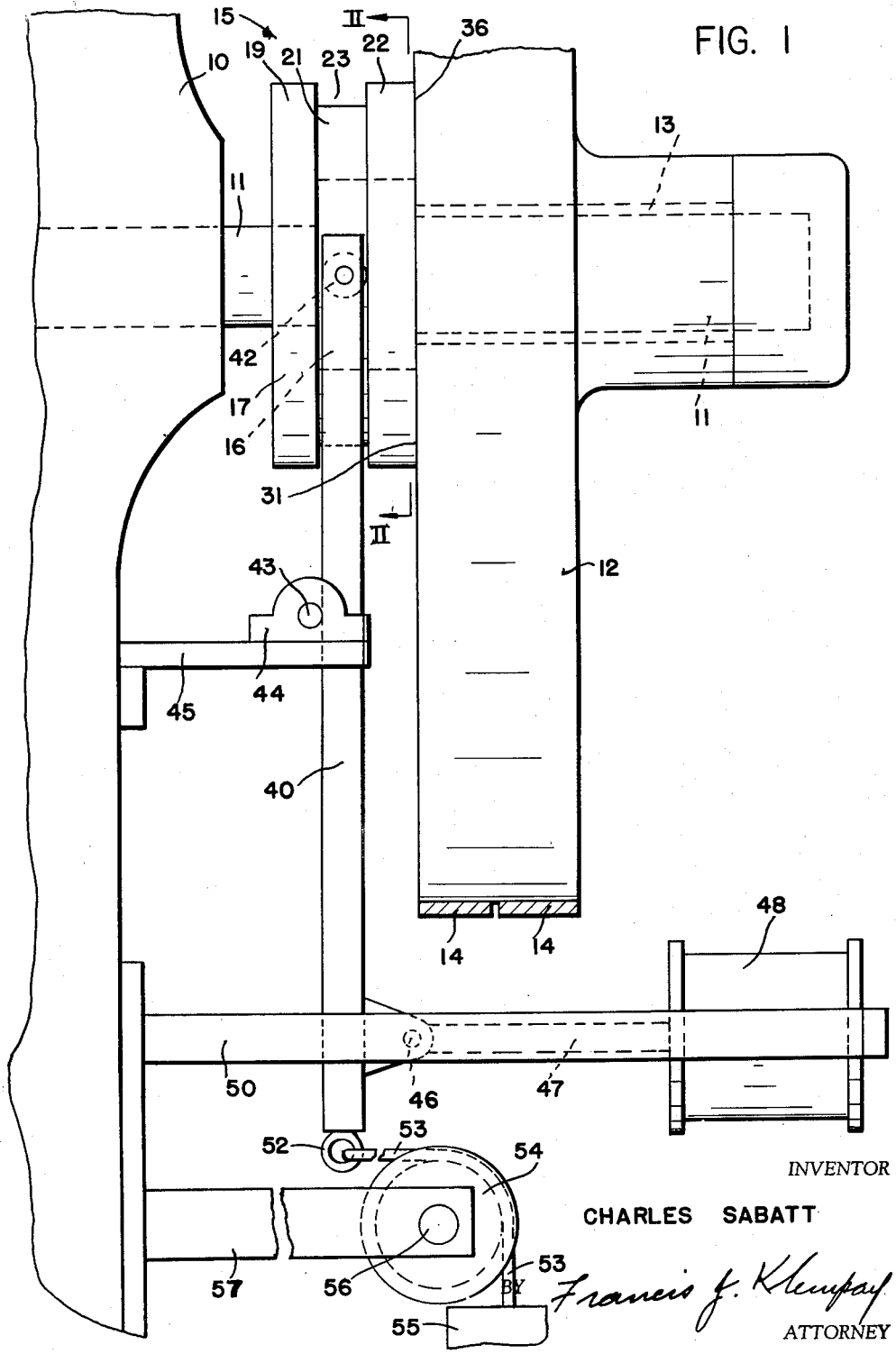
Figure 1 is a fragmentary side elevation, partially in section, showing a clutch constructed in accordance with the teachings of the present invention as employed with a press.

Referring now to the drawing, and initially to Figure 1 thereof, there is shown a frame 10 of a press which, in accordance with standard practice, has a reciprocating working member, not shown, that is adapted to be intermittently driven by a crankshaft 11. The crankshaft 11 projects outwardly from the side of the frame 10 and mounts adjacent its outer end a large flywheel 12. The flywheel 12 is journaled on the crankshaft 11 by means of an elongated tubular bushing 13 and is adapted to be continuously rotated at relatively low speeds by endless belts 14 that are connected to a suitable drive motor, not shown.

Mounted on the crankshaft 11 between the frame 10 of the press and the inner face 36 of the flywheel 12 is a clutch, generally indicated by the reference numeral 15. The clutch, in a manner to be hereinafter more fully explained, is movable axially along the crankshaft 11 to intermittently drivingly interconnect the rotating flywheel 12 and the crankshaft 11 as is desired.

Figure 2:
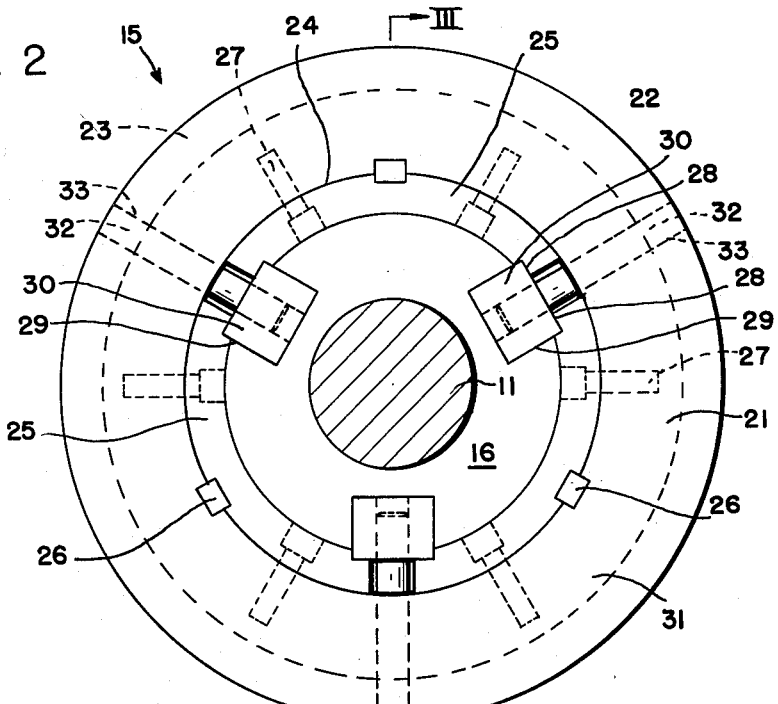
Figure 2 is an end sectional view taken along the section line II—II of Figure 1 showing the clutch of the present invention.
Figure 3:
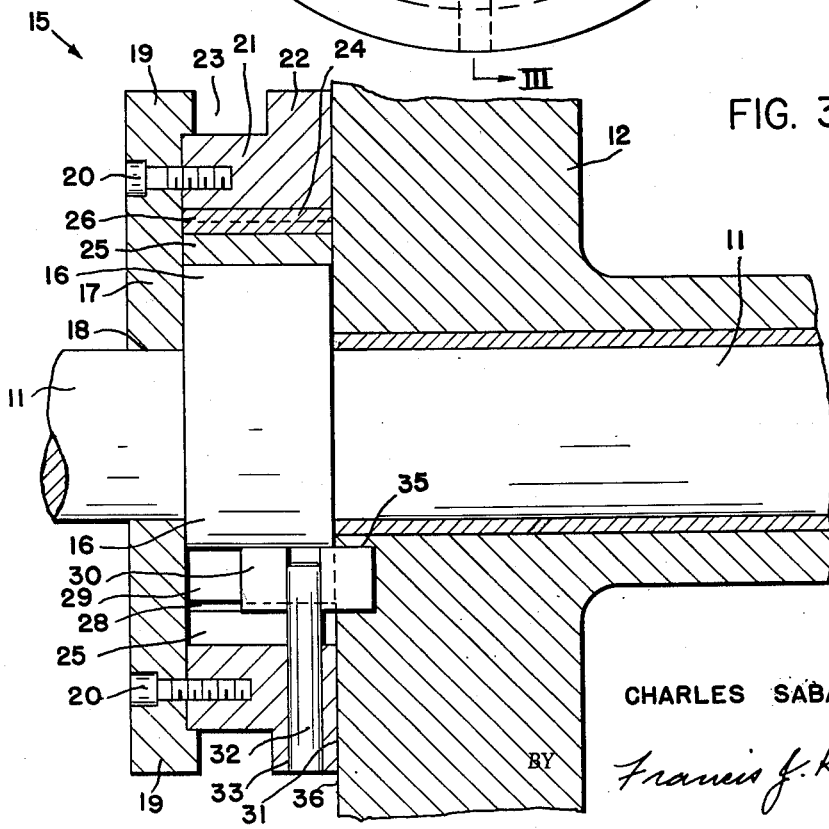
Figure 3 is a side sectional view taken along the section line III—III of Figure 2 showing the clutch drivingly connected to the flywheel.

Considering now the organization and construction of the clutch 15 and referring particularly to Figures 2 and 3 of the drawing, it will be noted that the crankshaft 11 is provided with a radially extending annular enlargement 16 which is disposed intermediate the inner face 36 of the flywheel and the frame of the press. Loosely mounted on the crankshaft 11 to the left of the annular enlargement 16 is a circular base plate 17 having a center aperture 18 therein for the passage of the crankshaft 11. The base plate 17 has an integral inwardly projecting annular flange 19 about its outer face and this base plate forms a support for the other component parts of the clutch. Rigidly bolted to the outer face of the base plate 17 by means of a plurality of circumferentially disposed axially extending bolts 20 is a ring-like generally T-shaped face plate 21 of appreciable axial dimension which has a radially projecting annular flange 22. The annular flanges 19 and 22 of the base plate 17 and the ring-like face plate 21, respectively, are spaced from each other and define a circular slot or depression 23. It will be noted that the inner end of the face plate 21 is nestingly received beneath the annular flange 19 of the base plate 17 and this, in combination with the plurality of bolts 20, provides a very rigid structure comprising the base plate 19 and the ring-like face plate 20.

Attached to the internal circular surface 24 of the ring-like face plate 21 are three circumferentially extending and spaced segmental spacers 25. Each of the spacers 25 is very rigidly attached to the internal circular surface 24 of the face plate 21 by means of a key 26 interlocking these members and a pair of radially extending recessed bolts 27. The segmental spacers 25 substantially fill the space between the internal circular surface 24 of the face plate 21 and the peripheral surface of the radially extending annular enlargement 16 of the crankshaft 11. As is clearly shown in Figure 2 of the drawing, the segmental spacers 25 are spaced with respect to each other and each of these segmental spacers is provided with a notch 28 on the internal surface thereof adjacent each of its ends.

The radially extending annular enlargement 16 of the crankshaft 11 is provided with three axially extending and circumferentially disposed relatively large rectangular spaced slots 29. Each of the slots 29 cooperates with the notches 28 in the ends of the segmental spacers adjacent thereto to define a rectangular axially extending way. Received within each of the three ways is a generally rectangular and elongated clutch tooth 30 which is adapted to project beyond the outer face 31 of the face plate 21. Each of the clutch teeth 30 is rigidly anchored in proper position within its respective way by means of a pin 32 that is snugly received in a bore 33 extending radially through the face plate 21 and the clutch tooth 30.

The flywheel 12 is provided with three circumferentially spaced openings 35 in the forward face 36 thereof which, when the clutch is in the position shown in the drawing, are adapted to be engaged by and nestingly receive the protruding portions of the clutch teeth 30. With the clutch so disposed the flywheel will be drivingly connected to the crankshaft through the clutch teeth 30.

As the flywheel is rotated the torque thereof will be imparted to the crankshaft since the rectangular clutch teeth 30 bear directly against the sides of the axial slots 29 in the radially extending annular enlargement 16 of the crankshaft. The clutch teeth 30 are relatively large and provide substantial areas of surface contact between these members and both the flywheel 12 and the crankshaft 11 whereby the clutch teeth are especially well adapted to transfer the driving torque from the flywheel to the crankshaft and to withstand the extremely high stresses developed. The base plate 17, face plate 21 and segmental spacers 25 will rotate with the flywheel, clutch teeth 30 and the crankshaft 11 since the clutch teeth are mounted by the pins 32 from the face plate 21 and are received in the notches 28 of the segmental spacers 25. The clutch 15 is adapted to be moved rearwardly from the position shown in the drawing whereby the clutch teeth 30 are retracted from engagement with the openings 35 in the flywheel 12. When the clutch 15 is retracted in this manner the outer face 31 of the face plate 21 and the inner face of the flywheel 12 will be spaced from each other by a distance at least equal to the distance the clutch teeth 30 project beyond the outer face 31 of the face plate 21. The apparatus for effecting axial movement of the clutch will be hereinafter described.

The clutch of the present invention is characterized by its extreme structural rigidity due to the manner in which the various component parts thereof are disposed and rigidly tied together. The plurality of bolts 20 attach the face plate 21 to the mounting plate 17 while the segmental spacers 25 are rigidly secured to the face plate 21 by the keys 26 and bolts 27. The clutch teeth 30 are rigidly mounted in their ways defined by the slots 29 and notches 28 by means of the large pins 32. There is thus provided a very rigid and compact structure well adapted for the intended use. The clutch 15 occupies a minimum amount of space in both the longitudinal and radial directions.

One of the most important aspects of the present invention is the ease with which the clutch may be manufactured and the component parts thereof removed and replaced. In the manufacture of the clutch no expensive or time consuming complicated machining operations are required and the various component parts can be completely and individually fabricated prior to final assembly. Also, any or all of the component parts of the clutch may be easily and readily replaced in a minimum of time and with a minimum of effort. For example, to replace one of the clutch teeth 30 it is only necessary to drive out the pin 32 associated therewith, slide out the tooth 30, insert a new clutch tooth, and then re-insert the pin 32 to properly position and retain the new clutch tooth.

Referring again to Figure 1 of the drawing and considering now the apparatus employed for effecting longitudinal movement of the clutch, there is provided a pair of transversely spaced operating levers 40 whose upper end portions are received within the circular recess 23 defined by the annular flanges 19 and 22 of the base plate 17 and face plate 21. Mounted on the upper end portions of the operating levers 40 are a pair of antifriction rollers 42 which engage the side walls of the depression 23 and whose axes of rotation are disposed transversely with respect to the axis of the crankshaft 11. The arrangement is such that the clutch 15 may rotate freely about its own axis.

Welded or otherwise attached to the operating levers 40 intermediate the ends thereof is a transversely extending shaft 43 whose ends are journaled in a pair of spaced pillow blocks 44. The pillow blocks 44 are mounted from the frame 10 of the press by a suitable bracket 45. The lower end portions of the operating levers 40 are pivotally attached by means of a transversely extending pivot pin 46 to the piston 47 of a fluid cylinder 48. The fluid cylinder 48 is rigidly mounted from the frame 10 of the press by a pair of spaced parallel supports 50 extending therefrom and suitable fluid supply circuits with associated control equipment, not shown, are provided for supplying fluid to the fluid cylinder 48.

Attached to the lower end of the operating levers 40 is an eye 52 which receives one end of a length of chain, cable or the like 53 which is entrained about a grooved pulley 54 and has its lower end connected to a heavy counterweight 55. The pulley 54 is mounted on a shaft 56 which spans a pair of transversely spaced supports 57 that extend from the frame 10. The counterweight 55 biases the operating levers 40 in such a manner that the clutch 15 is urged away from the inner face 36 of the flywheel 12. The fluid cylinder 48 is of sufficient capacity to normally counteract the effect of the counterweight 55 and when the clutch is engaged fluid pressure is maintained in the fluid cylinder to firmly hold the clutch against the flywheel. However, if for any reason the fluid pressure in the fluid cylinder 48 is released, such as failure of the control apparatus and/or the source of fluid pressure, for example, the counterweight 55 gains control to automatically and immediately disengage and retract the clutch. This is an important safety feature since it insures that the clutch will be maintained in engagement with the flywheel only when the fluid cylinder 48 is properly energized thereby preventing damage to either the press and/or the clutch.

In the operation of the apparatus above described it will be assumed that the clutch is initially in driving relation with respect to the flywheel 12 and the crankshaft 11 as is shown in the various views of the drawing. To disengage the clutch the operator actuates the control equipment to supply fluid to the fluid cylinder 48 in such a manner that the operating levers 40 are pivoted about their pivot point defined by the shaft 43 so that the upper end portions thereof and the clutch 15 move away from the flywheel 12 to withdraw the clutch teeth 30 from the openings 35. At this time the flywheel will continue to rotate on the crankshaft but the crankshaft will not rotate since there is no driving connection therebetween.

To re-engage the clutch the operator actuates the control equipment to supply fluid to the fluid cylinder 48 whereby the clutch moves back toward the inner face 36 of the flywheel. It is highly unlikely that as the clutch moves toward the flywheel the clutch teeth 30 and the openings 35 will be aligned since the flywheel is continuously rotating. However, the clutched teeth will bear against the inner face 36 of the flywheel and as the flywheel rotates to a position where the clutch teeth and the openings 35 are aligned the clutch teeth will be forced thereinto under the action of the fluid cylinder 48. It will be noted that inward movement of the clutch 15 is limited by the forward face of the base plate 17 striking the outer edge surface of the radially extending annular enlargement 16 of the crankshaft. When the clutch is engaged fluid pressure is retained in the fluid cylinder 48 to positively maintain the driving connection between the flywheel and the crankshaft and to overcome the effect of the counterweight 55.

It should thus be apparent that I have accomplished the objects initially set forth by providing highly improved and simplified clutch mechanism for presses and the like. Although there has been shown and described a preferred embodiment of the invention, it should be understood that many changes may be made therein without departing from the clear teachings thereof. For example, if desired, more or less than three clutch teeth can be provided and/or the segmental spacers can be made as an integral single part but because of ease of manufacture and assembly and in order to facilitate replacement of component parts I prefer to utilize the construction shown. Accordingly, reference should be had

I claim:

In a clutch assembly of the kind in which a shaft is to be controllably rotated by a normally continuously driven flywheel journaled on said shaft the improvement comprising a flat end face on said flywheel, an enlargement on said shaft having a flat end face abutting said flat end face of said flywheel, said enlargement having a plurality of circumferentially spaced but longitudinally extending grooves in its outer periphery, said grooves having sharply defined square corners along their bottom walls, a clutch dog slidably received in each of said grooves and being rectangular in cross section to snuggly fit within said grooves, a shift ring assembly mounted concentrically on said shaft and slidable longitudinally therealong, said assembly having an annular groove on its outer periphery adapted to receive a clutch actuating yoke and a heavy ring-like portion concentrically disposed about said enlargement, said ring-like portion carrying a plurality of circumferentially spaced but radially inward directed pins each having an interconnection with one of said dogs whereby upon longitudinal sliding movement of said assembly said dogs will be caused to slide longitudinally in said grooves, said dogs being of such longitudinal dimension and being so interconnected with said pins that said dogs will project longitudinally outward of said end face of said enlargement when the contiguous end face of said ring-like portion is aligned in the same plane as said end face of said enlargement, said flywheel having a plurality of circumferentially spaced recesses projecting into the said end face thereof adapted to receive the outwardly projecting portions of said dogs, said ring-like portion having its inner periphery spaced radially outward from the outer periphery of said enlargement, a plurality of arcuate-shaped inserts positioned between said inner and outer peripheries and circumferentially intermediate said pins, said inserts being keyed and secured to said ring-like portion and having adjacent their ends longitudinally extending square-cornered recesses to snugly receive the radially outward square corners of said dogs, and said inserts having end faces coplanar with said flat end faces of said enlargement and said ring-like portion when said clutch is engaged with the projecting ends of said dogs being received in their recesses in said flywheel.

References Cited in the file of this patent

UNITED STATES PATENTS

| | | |
|---|---|---|
| 298,979 | Johnson | May 20, 1884 |
| 628,585 | Lane et al. | July 11, 1899 |
| 688,889 | Scott | Dec. 17, 1901 |
| 2,384,418 | Edmondson | Sept. 4, 1945 |
| 2,450,161 | Price | Sept. 28, 1948 |
| 2,696,897 | Miller | Dec. 14, 1954 |
| 2,812,840 | Winter et al. | Nov. 12, 1957 |

FOREIGN PATENTS

| | | |
|---|---|---|
| 5,714 | France | May 2, 1906 |
| | (1st addition of 360,286) | |